United States Patent
Hinton et al.

(10) Patent No.: US 11,578,293 B2
(45) Date of Patent: Feb. 14, 2023

(54) NITROGEN INFUSED SPARKLING WINE AND METHODS OF MAKING SAME

(71) Applicant: Steven M. Dubois, New Bern, NC (US)

(72) Inventors: Lisa Hinton, Westminster, MD (US); Andrew Baker, Westminster, MD (US); Ashli Johnson, Finksburg, MD (US)

(73) Assignee: Steven M. Dubois, New Bern, NC (US)

( * ) Notice: Subject to any disclaimer, the term of this patent is extended or adjusted under 35 U.S.C. 154(b) by 812 days.

(21) Appl. No.: 16/533,004

(22) Filed: Aug. 6, 2019

(65) Prior Publication Data

US 2020/0040289 A1    Feb. 6, 2020

Related U.S. Application Data

(60) Provisional application No. 62/714,949, filed on Aug. 6, 2018.

(51) Int. Cl.
| | |
|---|---|
| *C12G 1/06* | (2019.01) |
| *B01F 23/2361* | (2022.01) |
| *B01F 23/236* | (2022.01) |
| *B01F 23/237* | (2022.01) |
| *B01F 101/16* | (2022.01) |

(52) U.S. Cl.
CPC ............ *C12G 1/06* (2013.01); *B01F 23/2361* (2022.01); *B01F 23/2362* (2022.01); *B01F 23/23765* (2022.01); *B01F 23/237621* (2022.01); *B01F 2101/16* (2022.01); *C12G 2200/21* (2013.01)

(58) Field of Classification Search
CPC .............. B01F 23/2361; B01F 23/2362; B01F 23/237621; B01F 23/23765; B01F 2101/16; C12G 1/06; C12G 2200/21; C12G 1/14; C12G 3/08
USPC .......................................... 426/15, 474, 477
See application file for complete search history.

(56) References Cited

U.S. PATENT DOCUMENTS

| | | | | |
|---|---|---|---|---|
| 4,832,968 | A * | 5/1989 | Forage .................. | B65D 85/73 426/115 |
| 6,607,100 | B2 * | 8/2003 | Phelps .................. | B67D 7/0266 222/399 |
| 7,717,294 | B2 * | 5/2010 | Bodemann .......... | B67D 1/0878 222/61 |

(Continued)

FOREIGN PATENT DOCUMENTS

| | | |
|---|---|---|
| GB | 1266351 | 3/1972 |
| KR | 20140008701 A * | 1/2014 |

OTHER PUBLICATIONS

CraftBEER.com; "Good Beer Gas: Nitro Beers Explained"; [downloaded from internet at https://www.craftbeer.com/craft-beer-muses/good-beer-gas-nitro-beers-explained] on Jul. 23, 2019; 4 pages.

(Continued)

*Primary Examiner* — Charles S Bushey
(74) *Attorney, Agent, or Firm* — Patent Portfolio Builders PLLC

(57) ABSTRACT

A carbon dioxide and nitrogen infused wine product includes wine infused with both carbon dioxide and nitrogen. A ratio of carbon dioxide to nitrogen in the wine can be in a range of 80% $CO_2$/20% $N_2$-60% $CO_2$/40% $N_2$.

14 Claims, 3 Drawing Sheets

(56) References Cited

U.S. PATENT DOCUMENTS

| | | | |
|---|---|---|---|
| 9,420,822 B2* | 8/2016 | Yanagawa | A23L 2/54 |
| 9,623,383 B1* | 4/2017 | Kleinrichert | A23F 5/24 |
| 10,477,883 B2* | 11/2019 | Giardino | B01F 23/231 |
| 10,710,865 B1* | 7/2020 | Beckley | B67D 1/0406 |
| 10,905,138 B2* | 2/2021 | Shirai | C12G 3/022 |
| 10,961,488 B2* | 3/2021 | Osborn | B01F 23/2363 |
| 11,040,314 B2* | 6/2021 | Giardino | B01F 25/3133 |
| 11,066,287 B2* | 7/2021 | Kleinrichert | B01D 53/26 |
| 2002/0197364 A1* | 12/2002 | Shyong Pan | B67C 3/222 |
| | | | 426/316 |
| 2006/0010886 A1 | 1/2006 | Clamage | |
| 2009/0022869 A1 | 1/2009 | Chakir | |
| 2013/0340497 A1* | 12/2013 | Tata | C12G 1/06 |
| | | | 73/1.06 |
| 2016/0222332 A1* | 8/2016 | Peirsman | C12C 5/026 |
| 2016/0289617 A1 | 10/2016 | Mackenzie et al. | |
| 2018/0125917 A1 | 5/2018 | Hoang | |
| 2018/0127693 A1 | 5/2018 | Ferreira et al. | |
| 2018/0213824 A1* | 8/2018 | Schacht | B01F 23/2361 |

OTHER PUBLICATIONS

Internet—On-Site Gas Systems; "Nitrogen Infusion Wine—The Benefits to Winemaking—Nitrogen Infuses Benefits to Winemaking Industry";[downloaded from internet on Jul. 23, 2018 at [https://www.onsitegas.com/blog/2016/12/07/nitrogen-infusion-winemaking]; 3 pages.

South Tek Systems; "Nitrogen Uses in the Wine Industry"; downloaded from the internet on Jul. 23, 2018 [http://www.southtektalk.com.com/2010/04/nitrogen-uses-in-wine-industry.html; 3 pages.

Wikipedia; "Widget (beer)"; downloaded from internet at [https://en.wikipedia.org/wiki/Widget_(beer)]; 10 pages, Oct. 2019.

* cited by examiner

NITROGEN INFUSED SPARKLING WINE AND METHODS OF MAKING SAME

TECHNICAL FIELD

Embodiments of the subject matter disclosed herein generally relate to nitrogen infused sparkling wine and methods and systems for making nitrogen infused sparkling wine.

BACKGROUND

Alcoholic beverages including beer, wine and liquor have long been a hallmark of civilization. Over the years, many different types of alcoholic beverages have been introduced, refined and reinvented as tastes and technology change.

Wine is a fermented beverage generally produced from grapes (or other fruits). As part of the wine making process, the sugar in the grapes is consumed by yeast yielding ethanol and carbon dioxide during the fermentation process. Fermented wine is then aged for a period of months or years before being packaged for consumption.

Winemaking is a complicated process since the taste and quality of the wine can be impacted by many variables including the type of grape and yeast used, the process used to make the wine, the terroir in which the grapes were grown etc. In addition, other external factors such as oxidation, bacteria and spoilage can negatively impact a wine's development. Regarding oxidation, it has been found that the use of nitrogen in various phases of the winemaking process can be helpful to reduce the negative effects of oxidation.

For example, nitrogen can be used to flush pumps, hoses and other transfer devices before bottling of the wine so that unwanted oxidation can be prevented during transfer. Additionally, since wine naturally dissolves oxygen during the fermentation and aging process, a technique called "sparging" was developed to counteract this oxidation effect. Specifically, sparging involves introducing fine gas bubbles of nitrogen to the bottom of a holding container and rise through the wine, enabling previously dissolved gases (e.g., oxygen or carbon dioxide) to transfer back into their gaseous states and rise to the top of the holding container where they can be removed. Nitrogen can also be used for "blanketing" to displace oxygen in the top of a wine holding container.

While nitrogen has historically been used as an inert gas in the winemaking process to remove (or avoid the introduction of) other gases to the wine, carbon dioxide has been infused into the wine intentionally to create so-called sparkling wine. Sparkling wine has a fizzy or effervescent quality to it that non-sparkling wines lack. This quality of sparkling wine is the result of carbon dioxide infusion which can, for example, be the result of a secondary fermentation of the wine or via a direct infusion of carbon dioxide into the wine, i.e., the carbonation process similar to that used to make soda drinks fizzy.

Unlike wine, beer typically has a foam component referred to as the beer's "head". A beer's head is generated by the wort protein, hops and yeast residue which are brought to the top of a poured beer by carbon dioxide which is typically generated by the beer fermentation process. However, somewhat more recently, it was determined that nitrogen could be used to give the beer's head a more creamy or frothy characteristic. See, e.g., UK Patent No. 1266351, assigned to Arthur Guinness Son and Company, published Mar. 8, 1972, the disclosure of which is incorporated herein. Unlike carbon dioxide, nitrogen is largely insoluble in liquid and, it has been found, that by using a ratio of nitrogen to carbon dioxide of between 50/50 and 75/25, a creamier frothier beer head can be generated.

Notwithstanding the very long history of these differences existing between the characteristics of beer and wine, Applicants decided to make a nitrogen infused sparkling wine. Much to their surprise, the result was a sparkling wine with a softer, frothier texture than other sparkling wines which contain only $CO_2$ gas. When the nitrogen infused sparkling wine is poured into a glass it has a beautiful, cascading effect.

Accordingly, it is desirable to provide wine making systems, methods and products which, among other things, enable consumers to enjoy nitrogen infused sparkling wine.

SUMMARY

According to embodiments, a method for making carbon dioxide and nitrogen infused wine comprises: infusing wine with carbon dioxide in a tank and infusing the carbon dioxide infused wine with nitrogen in an individual package. The step of infusing the wine with carbon dioxide can be performed either by fermentation in the tank or carbonation in the tank. The step of infusing the wine with nitrogen in the individual package can be performed using a nitrogen dosing system as part of a bottling or canning process. The step of infusing the wine with carbon dioxide can result in the carbon dioxide infused wine in the tank having a pressure in the range of 15-30 psi. The step of infusing the carbon dioxide infused wine in the individual package can result in the carbon dioxide and nitrogen infused wine in the individual package having a pressure in the range of 35-50 psi.

According to another embodiment, a carbon dioxide and nitrogen infused wine product includes wine infused with both carbon dioxide and nitrogen, wherein a ratio of carbon dioxide to nitrogen in said wine is in a range of 80% $CO_2$/20% $N_2$-60% $CO_2$/40% $N_2$.

According to other embodiments, a carbon dioxide and nitrogen infused wine product is made by the process of infusing wine with carbon dioxide in a tank and infusing the carbon dioxide infused wine with nitrogen in an individual package. The wine product can further be made by the process of infusing the wine with carbon dioxide can be performed either by fermentation in the tank or carbonation in the tank. The wine product can further be made by the process of infusing the wine with nitrogen in the individual package can be performed using a nitrogen dosing system as part of a bottling or canning process. The wine product can further be made by the process of infusing the wine with carbon dioxide can result in the carbon dioxide infused wine in the tank having a pressure in the range of 15-30 psi. The wine product can further be made by the process of infusing the carbon dioxide infused wine in the individual package can result in the carbon dioxide and nitrogen infused wine in the individual package having a pressure in the range of 35-50 psi.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
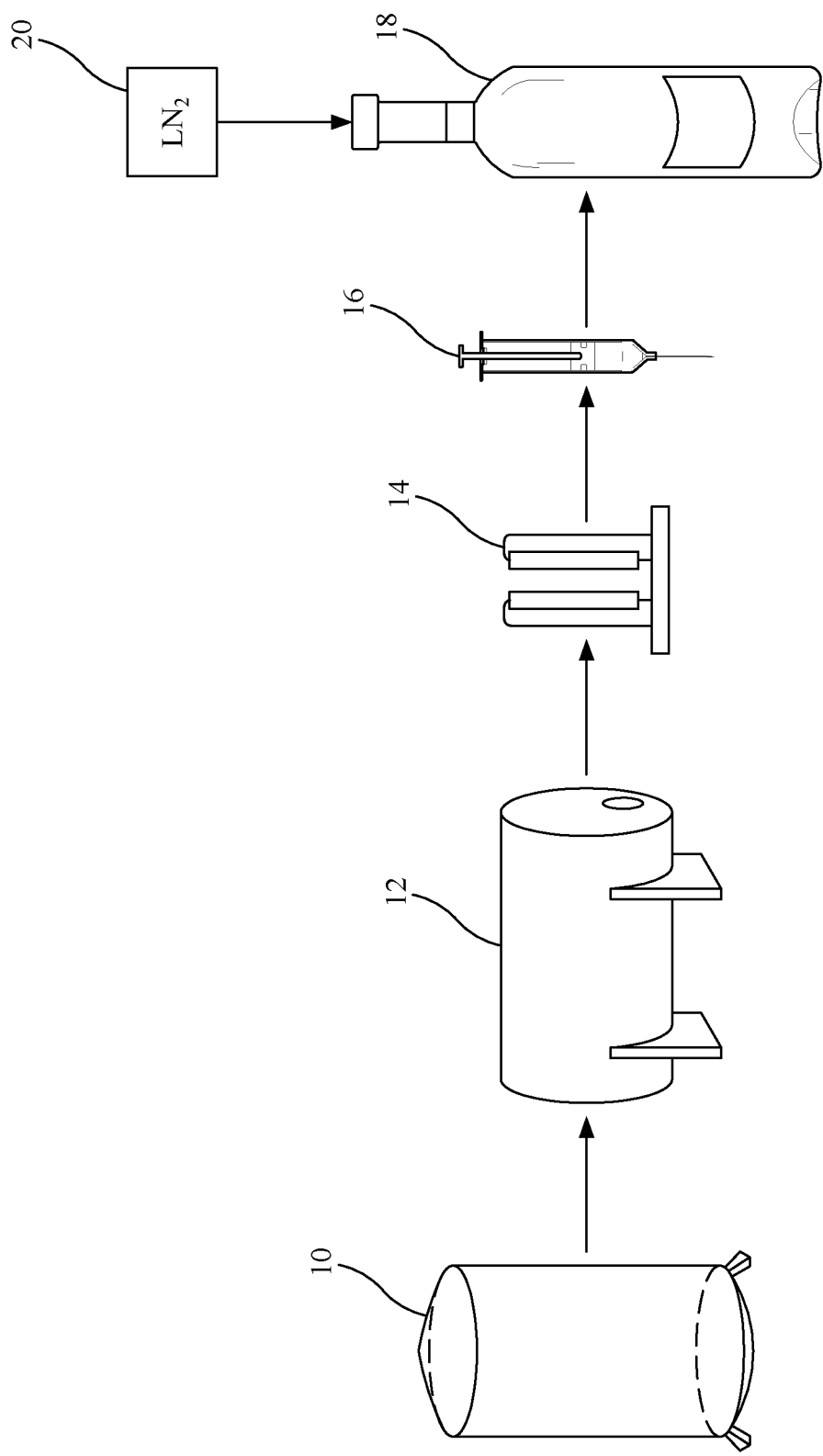
FIG. 1 depicts a process for making nitrogen infused sparkling wine according to one embodiment.

According to various embodiments, a nitrogen infused sparkling wine product and methods of making same are described. Sparkling wine, per se, can be made, for example, in one of two general ways. The first way, which is schematically illustrated in FIG. 1, is the so-called "tank" method. Also known by various other names, e.g., the Charmat method, Metodo Italiano, Cuvee Close, and autoclave, the tank method came about during the industrial advancements made in the early 20th century and is the main process used for making Prosecco and Lambrusco wines. The process starts with one or more base wines. As will be appreciated by those skilled in the art, base wine is essentially a grape juice which has undergone a primary fermentation process which results in an alcohol content of, for example, between 10 and 11.5% and a slightly acidic pH level. As shown in FIG. 1, the base wine is, together with the sugar and yeast mixture (known in the art as the "tirage"), transferred into a large pressure-resistant tank 10, also known as an autoclave. As the wine undergoes its second fermentation, schematically illustrated by tank 12 in a horizontal orientation, the $CO_2$ released from the second fermentation causes the tank 10 to pressurize. According to EU law, sparkling wine is a wine which has been pressurized during the second formation to above 3 bars (about 43.5 pounds per square inch (psi)) of additional pressure. The wine can then, optionally, be passed through a pressure-resistant filter 14 to remove sediment and an appropriate dosage 16 (i.e., a mixture of wine and sugar) can be added to the bottle 18 depending upon the desired dryness of the sparkling wine to be produced (e.g., brut sparkling wine has a dosage that yields 0-12 g/l of residual sugar). Note that although a bottle is depicted in FIG. 1, the nitrogen infused sparkling wine can also be packaged into other types of containers, e.g., cans.

According to this embodiment, during the bottling process 18 of the sparkling wine, each bottle 18 is dosed with liquid nitrogen as indicated by $LN_2$ block 20. The $LN_2$ dosing equipment 20 can, for example, be a dosing system such as that disclosed in U.S. Patent Publication 2006/0010886, entitled "Liquid Cryogen Dosing System With Nozzle for Pressuring and Inerting Containers", the disclosure of which is incorporated here by reference. Alternatively, any desired nitrogen dosing system can be used, e.g., those made by Chart Industries.

As the wine is transferred from the tank 10 to the bottle/can 18, liquid nitrogen is added using, according to one embodiment, a 180 millisecond dosing time. This dosing time may vary depending upon the type of nitrogen dosing system being used. However, according to one embodiment, this dosing time results in creating a $CO_2$ to Nitrogen ratio in the package in the range of 80% $CO_2$/20% $N_2$-60% $CO_2$/40% $N_2$, preferably 75% $CO_2$/25% $N_2$-65% $CO_2$/35% $N_2$, and, as one illustrative example, 75% $CO_2$/29% $N_2$. The initial pressure in the tank 10 is between, e.g., 1-4 psi, e.g., 2.7 psi. After secondary fermentation, but before adding the nitrogen to the package, the pressure in the package (due to the $CO_2$) is in the range of 15-25 psi, e.g., 18 psi. However after adding the nitrogen to the package, the total pressure (i.e., attributable to both the $CO_2$ pressurization and $N_2$ pressurization) is in the range of 35-50 psi, e.g., 45 psi. Applicants have found that this level of combined $CO_2$ and $N_2$ pressurization generates the softer, frothier sparkling wine which is desired.

As mentioned above, if the additional pressure is below 3 bars, e.g., about 43.5 psi then technically (at least under EU law) the wine is not "sparkling wine" but is instead "semi-sparkling wine". Accordingly as used herein the term "sparkling wine" is intended to include both semi-sparkling wine and sparkling wine, as embodiments are intended to include all relevant pressurization ranges.

Figure 2:
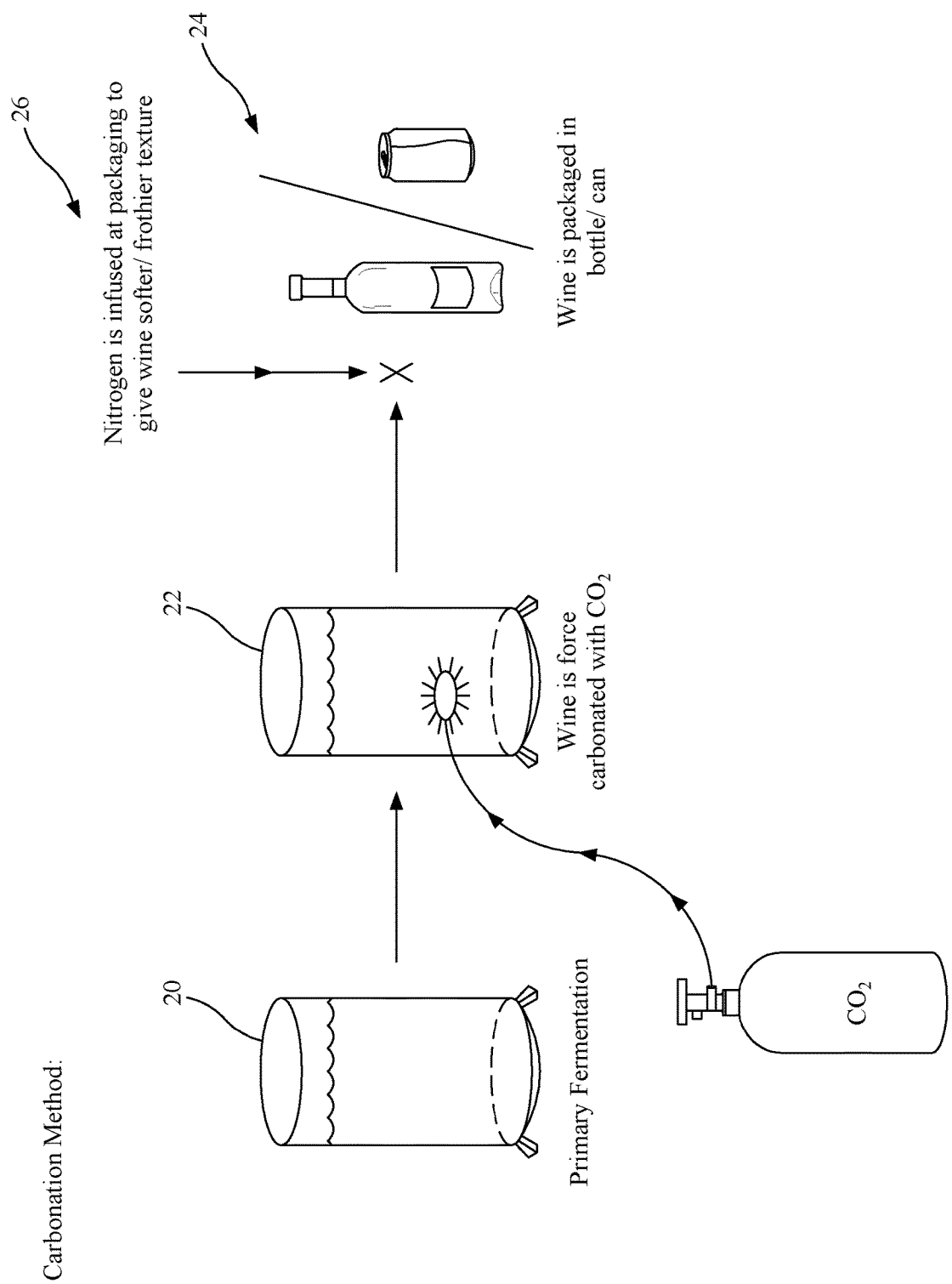
FIG. 2 depicts a process for making nitrogen infused sparkling wine according to an embodiment.

As an alternative to the tank method, nitrogen infused sparkling wine can also be made using the carbonation method as illustrated in FIG. 2. According to the carbonation method, after primary fermentation in tank 20, the wine is transferred to another tank 22 (or can remain in the first tank 20 if it is pressure resistant) where $CO_2$ is added under pressure to the tank 22 to pressurize the wine, e.g., to the level or range of levels indicated above. After this, as indicated by reference numerals 24 and 26, the pressurized wine is added to individual packages (e.g., bottle or can) and infused with nitrogen using a nitrogen dosing system to generate nitrogen infused sparkling wine, in the same manner as described above with respect to the embodiment of FIG. 1.

Figure 3:
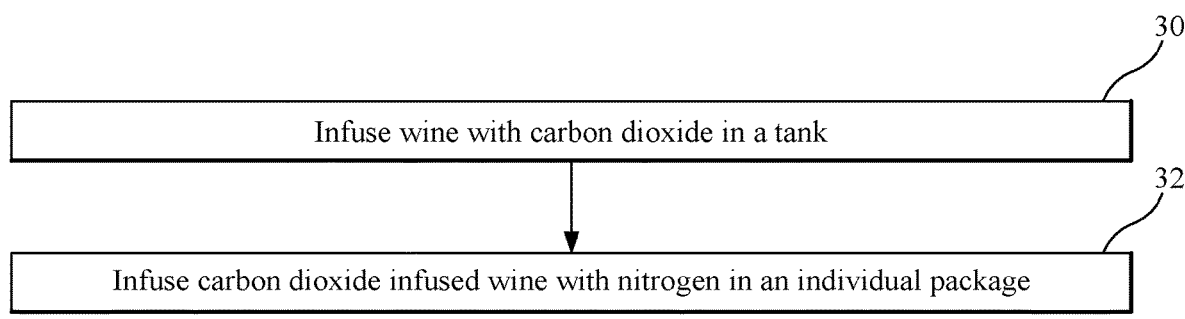
FIG. 3 is a flowchart illustrating a method for making nitrogen infused sparkling wine according to yet another embodiment.

According to an embodiment, a method for making carbon dioxide and nitrogen infused wine is illustrated in FIG. 3. Therein, at step 30, the wine is infused with carbon dioxide in a tank. At step 32, the carbon dioxide wine is further infused with nitrogen in an individual package, e.g., a 12 or 16 oz can or a 750 ml bottle. The step 30 of infusing the wine with carbon dioxide can be performed either by fermentation in the tank or carbonation in the tank. The step 32 of infusing the wine with nitrogen in the individual package can be performed using a nitrogen dosing system as part of a bottling or canning process. The step 30 of infusing the wine with carbon dioxide can result in the carbon dioxide infused wine in the tank having a pressure in the range of 15-30 psi. The step 32 of infusing the carbon dioxide infused wine in the individual package can result in the carbon dioxide and nitrogen infused wine in the individual package having a pressure in the range of 35-50 psi.

According to other embodiments, a carbon dioxide and nitrogen infuse wine product can be made by the process of the method of FIG. 3 and/or the any of the additional substeps noted above or in the previous embodiments. That is a wine product can be made by the process of infusing wine with carbon dioxide in a tank and infusing the carbon dioxide infused wine with nitrogen in an individual package. The wine product can further be made by the process of infusing the wine with carbon dioxide can be performed either by fermentation in the tank or carbonation in the tank. The wine product can further be made by the process of infusing the wine with nitrogen in the individual package can be performed using a nitrogen dosing system as part of a bottling or canning process. The wine product can further be made by the process of infusing the wine with carbon dioxide can result in the carbon dioxide infused wine in the tank having a pressure in the range of 15-30 psi. The wine product can further be made by the process of infusing the carbon dioxide infused wine in the individual package can result in the carbon dioxide and nitrogen infused wine in the individual package having a pressure in the range of 35-50 psi.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A carbon dioxide and nitrogen infused wine product comprising:
   wine infused with both carbon dioxide and nitrogen;
   wherein a ratio of carbon dioxide to nitrogen in said wine is in a range of 80% $CO_2$/20% $N_2$-60% $CO_2$/40% $N_2$.

2. The carbon dioxide and nitrogen infused wine product of claim 1, wherein said ratio is in the range of 75% $CO_2$/25% $N_2$-65% $CO_2$/35% $N_2$.

3. A method of infusing wine with carbon dioxide and nitrogen, the method comprising:
   infusing wine with carbon dioxide in a tank; and
   infusing the carbon dioxide infused wine with nitrogen in an individual package to a level wherein a ratio of carbon dioxide to nitrogen in said wine is in a range of 80% $CO_2$/20% $N_2$-60% $CO_2$/40% $N_2$.

4. The method of claim 3, wherein the step of infusing the wine with carbon dioxide is performed either by fermentation in the tank or carbonation in the tank.

5. The method of claim 4, wherein the step of infusing the wine with carbon dioxide further comprises pressurizing the wine to within a range of 15-30 psi.

6. The method of claim 5, wherein the step of infusing the wine with nitrogen in the individual package is performed using a nitrogen dosing system as part of a bottling or canning process.

7. The method of claim 6, wherein the step of infusing the carbon dioxide infused wine in the individual package results in the carbon dioxide and nitrogen infused wine in the individual package having a pressure in the range of 35-50 psi.

8. The method of claim 3, wherein the step of infusing the carbon dioxide infused wine with nitrogen infuses the wine to a level wherein said ratio is in the range of 75% $CO_2$/25% $N_2$-65% $CO_2$/35% $N_2$.

9. A wine product made by the process of:
   infusing wine with carbon dioxide in a tank; and
   infusing the carbon dioxide infused wine with nitrogen in an individual package to a level wherein a ratio of carbon dioxide to nitrogen in said wine product is in a range of 80% $CO_2$/20% $N_2$-60% $CO_2$/40% $N_2$.

10. The wine product of claim 9, wherein the step of infusing the wine with carbon dioxide is performed either by fermentation in the tank or carbonation in the tank.

11. The wine product of claim 10, wherein the step of infusing the wine with carbon dioxide further comprises pressurizing the wine to within a range of 15-30 psi.

12. The wine product of claim 11, wherein the step of infusing the carbon dioxide infused wine with nitrogen in the individual package is performed using a nitrogen dosing system as part of a bottling or canning process.

13. The wine product of claim 12, wherein the step of infusing the carbon dioxide infused wine in the individual package results in the carbon dioxide and nitrogen infused wine in the individual package having a pressure in the range of 35-50 psi.

14. The wine product of claim 9, wherein said ratio is in the range of 75% CO2/25% N2-65% CO2/35% N2.

* * * * *

UNITED STATES PATENT AND TRADEMARK OFFICE
CERTIFICATE OF CORRECTION

PATENT NO. : 11,578,293 B2
APPLICATION NO. : 16/533004
DATED : February 14, 2023
INVENTOR(S) : Lisa Hinton, Andrew Baker and Ashli Johnson It is certified that error appears in the above-identified patent and that said Letters Patent is hereby corrected as shown below:

In the Specification

In Column 4, Lines 11 and 12, delete "75% CO2/29% N2." and insert --71% C02- 29% N2.--

Signed and Sealed this
Fourth Day of April, 2023

Katherine Kelly Vidal
*Director of the United States Patent and Trademark Office*